(12) United States Patent
Arcella et al.

(10) Patent No.: US 6,639,011 B2
(45) Date of Patent: Oct. 28, 2003

(54) POLYMERIZATION PROCESS OF SULPHONIC MONOMERS

(75) Inventors: Vincenzo Arcella, Nerviano (IT); Alessandro Ghielmi, Milan (IT); Giulio Tommasi, Milan (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 10/324,123

(22) Filed: Dec. 20, 2002

(65) Prior Publication Data

US 2003/0130458 A1 Jul. 10, 2003

(30) Foreign Application Priority Data

Dec. 21, 2001 (IT) .......................................... MI01A2744

(51) Int. Cl.$^7$ ................................................ C08L 11/02
(52) U.S. Cl. ........................ 524/835; 524/805; 524/817
(58) Field of Search ................................ 524/805, 817, 524/835

(56) References Cited

U.S. PATENT DOCUMENTS

| | | | |
|---|---|---|---|
| 2,242,218 A | 5/1941 | Auer et al. | |
| 3,665,041 A | 5/1972 | Sianesi et al. | |
| 3,714,245 A * | 1/1973 | Beckerbauer | ........... 260/543 F |
| 3,715,378 A | 2/1973 | Sianesi et al. | |
| 3,810,874 A | 5/1974 | Mitsch et al. | |
| 4,035,565 A | 7/1977 | Apotheker et al. | |
| 4,243,770 A | 1/1981 | Tatemoto et al. | |
| 4,269,790 A * | 5/1981 | de Vries | ................. 260/543 F |
| 4,310,400 A * | 1/1982 | Mark, Jr. et al. | ....... 204/195 M |
| 4,564,662 A | 1/1986 | Albin | |
| 4,694,045 A | 9/1987 | Moore | |
| 4,745,165 A | 5/1988 | Arcella et al. | |
| 4,943,622 A | 7/1990 | Narkai et al. | |
| 5,173,553 A | 12/1992 | Albano et al. | |
| 5,374,770 A * | 12/1994 | Navarrini et al. | ........... 562/111 |

FOREIGN PATENT DOCUMENTS

| | | |
|---|---|---|
| EP | 0 148 482 A2 | 7/1985 |
| EP | 0 199 138 B1 | 10/1986 |
| EP | 0 239 123 A2 | 9/1987 |
| EP | 0 466 483 A1 * | 1/1992 |

* cited by examiner

Primary Examiner—Helen L. Pezzuto
(74) Attorney, Agent, or Firm—Arent Fox Kintner Plotkin & Kahn PLLC

(57) ABSTRACT

A polymerization process in aqueous emulsion of:
(I) one or more fluorinated monomers containing at least one ethylene unsaturation;
(II) one or more fluorinated monomers, containing sulphonyl groups —$SO_2F$;

said process comprising the use of a surfactant having the formula:

$$R_f\text{—}X^-M^+$$

wherein
X is equal to —COO, —$SO_3$;
M is selected from H, $NH_4$, alkaline metal;
$R_f$ represents a (per)fluoropolyether chain, preferably having number average molecular weight comprised between about 230 and about 1,800.

10 Claims, No Drawings

POLYMERIZATION PROCESS OF SULPHONIC MONOMERS

The invention relates to a polymerization process to obtain sulphonic fluorinated ionomers with high productivity.

Specifically, the invention relates to a polymerization process in emulsion to obtain sulphonic fluorinated-ionomers, said process characterized by high productivity and by operating conditions such to minimize the coagulum formation during the polymerization and the reactor corrosion.

The polymerization of fluorinated monomers in emulsion is known in the prior art. However the productivity data are much lower compared with the polymerization in microemulsion by using ammonium perfluorooctanoate which is the industrially commonly used surfactant for the polymerization in aqueous emulsion of fluorinated monomers. It shows a series of drawbacks with respect to the polymerization in microemulsion. Higher polymerization yields are obtained by using the microemulsion.

The need was therefore felt to have available a polymerization process to obtain sulphonic fluorinated ionomers, said process characterized by high productivity, absence of coagulum formation during the polymerization and minimal reactor corrosion.

An object of the present invention is a polymerization process in aqueous emulsion of:

(I) one or more fluorinated monomers containing at least one ethylene unsaturation;
(II) one or more fluorinated monomers containing sulphonyl groups $-SO_2F$;

said process comprising:

reactor purging, monomer (II) introduction in liquid form into the reactor, reactor pressurization with gaseous monomers (I); addition of at least one surfactant of formula:

$$R_f-X^-M^+$$

wherein
X is equal to $-COO$, $-SO_3$;
M is selected from H, $NH_4$, alkaline metal;
$R_f$ represents a (per)fluoropolyether chain, preferably having number average molecular weight comprised between about 230 and about 1,800, preferably from 300 to 750, said (per)fluoropolyether chain comprising repeating units selected from one or more of the following:
a) $-(C_3F_6O)-$;
b) $-(CF_2CF_2O)-$;
c) $-(CFL_0O)-$, wherein $L_0=-F, -CF_3$;
d) $-CF_2(CF_2)_{z'}CF_2O-$, wherein z' is an integer 1 or 2;
e) $-CH_2CF_2CF_2O-$.

$R_f$ is monofunctional, and has a (per)fluorooxyalkyl end group T, for example $CF_3O-$, $C_2F_5O-$, $C_3F_7O-$; optionally in the (per)fluoroalkyl end groups one fluorine atom can be substituted by one chlorine or hydrogen atom;

addition of the initiator and, during the polymerization, feeding of monomers (I) so as to maintain constant the reactor pressure; optionally further addition of monomer (II) and of chain transfer agents.

Preferably during the polymerization the monomer (II) is added by steps.

Examples of end groups containing chlorine or hydrogen atoms are $Cl(C_3F_6O)-$, $H(C_3F_6O)-$. The unit a) $C_3F_6O$ is $-CF_2-CF(CF_3)O-$ or $-CF(CF_3)CF_2O-$.

In particular $R_f$ has preferably one of the following structures:

1) $T-(CF_2O)_a-(CF_2CF_2O)_b-CF_2-$ with b/a comprised between 0.3 and 10, extremes included, a being an integer different from 0;
2) $T-(CF_2-(CF_2)_{z'}-CF_2O)_{b'}-CF_2-$ wherein z' is an integer equal to 1 or 2;
3) $T-(C_3F_6O)_r-(C_2F_4O)_b-(CFL_0O)_t-CF_2-$ with r/b=0.5–2.0 (r+b)/t=10–30, b and t being integers different from 0 when all the units with indexes r, b, and t are present; or b=t=0, or b=0;

a, b, b', r, t, are integers, whose sum is such that $R_f$ has the above values of number average molecular weight.

The compounds wherein $R_f$ has the following formula are still more preferred:

$$T-(CF_2CF(CF_3)O)_m(CF_2O)_n-CF_2-$$

wherein m/n=1–30;
wherein $T=-OCF_3$ or $-OCF_2Cl$,
X is a carboxylic group and M is $NH_4$, K.

Mixtures of one or more surfactants of the above classes can be used.

The (per)fluoropolyethers $R_f$ are obtainable with the well known processes of the prior art, see for example the following patents herein incorporated by reference: U.S. Pat. Nos. 3,665,041, 2,242,218, 3,715,378, and the European patent EP 239,123. The functionalized fluoropolyethers with hydroxyl termination are obtained for example according to patents EP 148,482, U.S. Pat. No. 3,810,874, from which the functional groups X are obtained with the processes mentioned in said patents.

At the end of the polymer process a latex is obtained. The latex discharged from the polymerization reactor can be subjected, if desired, to the usual post-treatments depending on the planned uses, in particular on the coagulation and drying process.

The fluorinated monomers of type (I) are selected from:
vinylidene fluoride (VDF);
$C_2-C_8$ perfluoroolefins, preferably tetrafluoroethylene (TFE);
$C_2-C_8$ chloro- and/or bromo- and/or iodo-fluoroolefins, such as chlorotrifluoroethylene (CTFE) and bromotrifluoroethylene;
(per)fluoroalkylvinylethers (PAVE) $CF_2=CFOR_f$, wherein $R_f$ is a $C_1-C_6$ (per)fluoroalkyl, for example trifluoromethyl, bromo difluoromethyl, pentafluoropropyl;
perfluoro-oxyalkylvinylethers $CF_2=CFOX$, wherein X is a $C_1-C_{12}$ perfluoro-oxyalkyl having one or more ether groups, for example perfluoro-2-propoxy-propyl.

The fluorinated monomers of type (II) are selected from:
$F_2C=CF-O-CF_2-CF_2-SO_2F$ (vinylsulphonylfluoride);
$F_2C=CF-O-[CF_2-CXF-O]_n-CF_2-CF_2-SO_2F$ wherein X=Cl, F or $CF_3$; n=1–10;
$F_2C=CF-O-CF_2-CF_2-CF_2-SO_2F$;
$F_2C=CF-Ar-SO_2F$.

Optionally in the polymerization process of the present invention, besides the monomers of type (I) and (II) bis olefins of formula:

$$R_1R_2C=CH-(CF_2)_m-CH=CR_5R_6 \qquad (III)$$

can bemused as comonomers, in an amount in the range 0.01–5% by moles, wherein:

m=2–10, preferably 4–8;

$R_1$, $R_2$, $R_5$, $R_6$, equal to or different from each other, are H or $C_1$–$C_5$ alkyl groups.

Optionally in the polymerization process of the present invention brominated and/or iodinated "cure-site" comonomers, can be fed, as bromo and/or iodo olefins having from 2 to 10 carbon atoms (as described for example in U.S. Pat. No. 4,035,565 and U.S. Pat. No. 4,694,045), or iodo and/or bromo fluoro-alkylvinylethers (as described in U.S. Pat. No. 4,745,165, U.S. Pat. No. 4,564,662 and EP 199,138), in such amounts whereby the "cure-site" comonomer content in the final product is generally comprised between 0.05 and 2 moles per 100 moles of the other basis monomeric units.

Alternatively or also in combination with the "cure-site" comonomers, it is possible to introduce in the end groups iodine and/or bromine atoms by addition to the reaction mixture of iodinated and/or brominated chain transfer agents, such for example the compounds of formula $R_f(I)_x(Br)_y$, wherein $R_f$ is a (per)fluoroalkyl or a (per)fluorochloroalkyl having from 1 to 8 carbon atoms, while x and y are integers comprised between 0 and 2, with $1 \leq x+y \leq 2$ (see for example U.S. Pat. No. 4,243,770 and U.S. Pat. No. 4,943,622). It is also possible to use as chain transfer agents iodides and/or bromides of alkaline or alkaline-earth metals, according to U.S. Pat. No. 5,173,553. Other usable chain transfer agents are molecules containing hydrogen, such as hydrocarbons, alcohols, in particular ethyl acetate and ethane.

The polymerization initiators used in the process of the present invention are organic or inorganic. As organic initiators, IPP, DTBP, etc. can for example be mentioned. Preferably radical inorganic initiators, such for example the ammonium and/or potassium and/or sodium persulphate, optionally in combination with ferrous, cupreous or silver salts, are used. The initiator feeding procedures can be in a continuous way or by a single addition at the polymerization starting.

Preferably in the polymerization process of the present invention are used as comonomers:

TFE;

$CF_2=CF-O-CF_2CF_2SO_2F$;

optionally a bis-olefin of formula (III), wherein $R_1$, $R_2$, $R_5$, $R_6$ are H and m=6 or 8.

With the polymerization process of the invention it is possible to obtain sulphonic fluorinated ionomers having a high molecular weight and a good chemical and thermal stability. However it is possible to reduce the molecular weight by using chain transfer agents as above mentioned.

With the polymerization process of the invention it is possible to obtain sulphonic fluorinated ionomers having both high and low equivalent weight, in particular comprised between 300 and 1,700. The equivalent weight can decrease till to 280 when the preferred sulphonic monomer is homopolymerized.

The polymerization reaction is generally carried out at temperatures in the range 25°–130° C., at atmospheric pressure or under pressure, for example from 2 bar up to 60 bar.

Preferably the polymerization reaction is generally carried out at temperatures in the range 50°–70° C., preferably 50°–60° C., under pressure up to 30 bar, preferably higher than 8 to obtain high molecular weights.

The sulphonic fluorinated ionomers obtained from the invention process are suitable to be used in the preparation of membranes for fuel cells, of membranes for electrochemical applications, such for example chloro-soda cells, lithium batteries, and electrodialysis, and in reactors in which the ionomeric membrane acts as a superacid catalyst.

The results obtained with the present invention are surprising and unexpected, since high productivities of the order of those obtainable with the microemulsions are obtained, without the drawbacks related to the use of the microemulsions. However the microemulsion use requires a supplementary unit for their preparation and the use of various components for their obtaining. Some of said components remain in the final polymer and to remove them supplementary polymer treatments are required.

Furthermore the productivity data obtained are surprisingly and unexpectedly much higher with respect to the ammoniumperfluorooctanoate which is the industrially commonly used surfactant for the polymerization in aqueous emulsion.

The following Examples are mentioned for illustrative, but not limitative purposes of the scope of the invention.

EXAMPLES

Characterization

Hydration Percentage

After drying the membrane is weighed and subsequently hydrated in distilled water at 100° C. for 30 minutes; then it is extracted from the water, dried on the surface and weighed again.

The hydration percentage H% of the membrane is evaluated according to the following formula:

$$H=100\times(\text{weight hydrated-weight dried})/\text{weight dried}$$

Example 1

In a 22 liter autoclave the following reactants are introduced:

11.5 l of demineralized water;

980 g of the monomer of formula $CF_2=CF-O-CF_2CF_2-SO_2F$;

3,100 g of an aqueous solution at 5% by weight of a fluoropolyoxyalkylene with acid end group potassium salified having number average molecular weight 521, of formula:

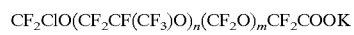

wherein n/m=10;

The autoclave, kept under stirring at 540 rpm, is heated to 60° C. Then 150 ml of an aqueous solution having a concentration of 3 g/l of potassium persulphate. (KPS) are fed into the autoclave. The pressure is brought to 12 absolute atm by introducing TFE. The reaction starts after 7 minutes. The pressure is maintained at 12 absolute atm by feeding TFE. When 800 g of TFE have been fed to the reactor, 220 g of the sulphonyl monomer of formula $CF_2=CF-O-CF_2-CF_2-SO_2F$ are introduced into the reactor. From now on, 220 g of the sulphonyl monomer of formula $CF_2=CF_2-O-CF_2CF_2SO_2F$ are introduced into the reactor every 200 g of fed TFE. The total amount of TFE fed to the reactor is equal to 4,000 g. The reaction is stopped after 473 minutes by interrupting the TFE feeding, cooling and venting the reactor under vacuum. The produced latex has a solid content of 26.2% by weight. The productivity of the obtained sulphonic ionomer in g/(l×h) is 39. The latex is coagulated by freezing and unfreezing, the polymer is separated from the mother liquors, washed with water up to a constant pH of the washing waters and dried at 150° C. for 40 hours at room pressure. Some grams of the dried polymer powder are converted into the acid form by treatment at 80° C. for 24 hours with KOH at 16 by weight, subsequent washing with $H_2O$, and treatment at room temperature for 24 hours with HCl at 20% by weight, and subsequent washing with $H_2O$. The copolymer equivalent weight, determined by titration on the polymer in the acid form ($-SO_3H$) results to be 875 g/eq, corresponding to a composition of 85.66 by moles of TFE and 14.4% by moles of sulphonic monomer. The polymer in the sulphonyl fluoride form ($-SO_2F$) results to have a MFI=58 g/10' at 280° C. with a load of 5 kg (ASTM D 1238-52T).

The polymer in the sulphonyl fluoride form is transformed into granules by a conic corotating Brabender twin-screw extruder having the screw diameter from 4.3 to 2.3 by using a melted temperature T=215° C.

The granules are transformed in film having a thickness ranging from 10 to 400 micron by using the above extruder with a melted temperature T=215° C.

A portion of the film is converted into the acid form by treatment at 80° C. for 24 hours with KOH at 10% by weight, washing with $H_2O$ and subsequent treatment at room temperature for 24 hours with HCl at 20% by weight and subsequent washing with $H_2O$. It has a hydration at 100° C. of 88.7%.

The film conditioned in air at 25° C. and 50% of relative humidity has a stress at break of 21 MPa (ASTM D 1708).

Example 1A (Comparative)

Example 1 has been repeated by using an equimolar amount of sodium perfluorooctanoate instead of the surfactant of Example 1.

In a 22 liter autoclave, the following reactants are introduced:

12.5 l of demineralizedwater;
980 g of the monomer of formula $CF_2=CF-O-CF_2CF_2-SO_2F$;
2,130 g of an aqueous solution at 6.1% by weight of sodium perfluorooctanoate.

The autoclave, kept under stirring at 540 rpm, is heated to 60° C. Then 150 ml of an aqueous solution having a concentration of 3 g/l of potassium persulphate (KPS) are fed into the autoclave. The pressure is brought to 12 absolute atm by introducing TFE. The reaction starts after 10 minutes. The pressure is maintained at 12 absolute atm by feeding TFE. When 800 g of TFE have been fed to the reactor, 220 g of the sulphonyl monomer of formula $CF_2=CF-O-CF_2-CF_2-SO_2F$ are introduced into the reactor. From now on, 220 g of the sulphonyl monomer of formula $CF_2=CF-O-CF_2CF_2SO_2°F$ are introduced in the reactor every 200 g of fed TFE. The total amount of TFE fed to the reactor is equal to 2,765 g. The reaction is stopped after 483 minutes by interrupting the TFE feeding, cooling and venting the reactor under vacuum. The produced latex has a solid content of 19.3% by weight. The productivity of the obtained sulphonic ionomer in g/(l×h) is 27. The latex is coagulated by freezing and unfreezing, the polymer is separated from the mother liquors, washed with water up to a constant pH of the washing waters and dried at 150° C. for 40 hours at room pressure. Some grams of the dried polymer powder are converted into the acid form by treatment at 80° C. for 24 hours with KOH at 10% by weight, subsequent washing with $H_2O$, and treatment at room temperature for 24 hours with HCl at 20% by weight, and subsequent washing with $H_2O$. The copolymer equivalent weight, determined by titration on the polymer in the acid form ($-SO_3H$) results to be 884 g/eq, corresponding to a composition of 85.8% by moles of TFE and 14.2% by moles of sulphonic monomer. The polymer in the sulphonyl fluoride form ($-SO_2F$) results to have a MFI=49 g/10' at 280° C. with a load of 5 kg (ASTM D 1238-52T).

The polymer in the sulphonyl fluoride form is transformed into granules by a conic corotating Brabender twin-screw extruder having the screw diameter from 4.3 to 2.3 by using a melted temperature T=215° C.

The granules are transformed in film having a thickness ranging from 10 to 400 micron by using the above extruder with a melted temperature T=215° C.

A portion of the film is converted into the acid form by treatment at 80° C. for 24 hours with KOH at 10% by weight, washing with $H_2O$ and subsequent treatment at room temperature for 24 hours with HCl at 20% by weight and subsequent washing with $H_2O$. It has a hydration at 100° C. of 88.7%.

The film conditioned in air at 25° C. and 50% of relative humidity has a stress at break of 21 MPa (ASTM D 1708).

Example 2

In a 22 liter autoclave, the following reactants are introduced:

12.5 l of demineralized water;
980 g of the monomer of formula $CF_2=CF-O-CF_2CF_2-SO_2F$;
3,100 g of an aqueous solution at 5% by weight of a fluoropolyoxyalkylene having acid end group potassium salified with number average molecular weight 521, of formula:

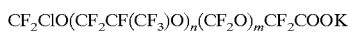
$CF_2ClO(CF_2CF(CF_3)O)_n(CF_2O)_mCF_2COOK$ wherein n/m=10;

The autoclave, kept under stirring at 540 rpm, is heated to 60° C. Then 300 ml of an aqueous solution having a concentration of 3 g/l of potassium persulphate (KPS) are fed into the autoclave. The pressure is brought to 12 absolute atm by introducing TFE. The reaction starts after 1 minute. The pressure is maintained at 12 absolute atm by feeding TFE. When 800 g of TFE have been fed to the reactor, 220 g of the sulphonyl monomer of formula $CF_2=CF-O-CF_2-CF_2-SO_2F$ are introduced into the reactor. From now on, 220 g of the sulphonyl monomer of formula $CF_2=CF-O-CF_2CF_2SO_2F$ are introduced into the reactor every 200 g of fed TFE. The total amount of TFE fed to the reactor is equal to 4,000 g.

The reaction is stopped after 223 minutes by interrupting the TFE feeding, cooling and venting the reactor under vacuum. The produced latex has a solid content of 25.9% by weight. The productivity of the obtained sulphonic ionomer in g/(l×h) is 82.

The latex is coagulated by freezing and unfreezing, the polymer is separated from the mother liquors, washed with water up to a constant pH of the washing waters and dried at 150° C. for 40 hours at room pressure. Some grams of the dried polymer powder are converted into the acid form by treatment at 80° C. for 24 hours with KOH at 10% by weight, washing with $H_2O$, and subsequent treatment at room temperature for 24 hours with HCl at 20% by weight, and subsequent washing with $H_2O$. The copolymer equivalent weight, determined by titration on the polymer in the acid form ($-SO_3H$), results to be 926 g/eq, corresponding to a composition of 86.6% by moles of TFE and 13.4% by moles of sulphonic monomer. The polymer in the sulphonyl fluoride form ($-SO_2F$) results to have a MFI 13 g/10' at 280° C. with a load of 5 kg (ASTM D 1238-52T).

The polymer in the sulphonyl fluoride form is transformed into granules by a conic corotating Brabender twin-screw extruder having the screw diameter from 4.3 to 2.3 using a melted temperature T=225° C.

The granules are transformed in film having a thickness ranging from 10 to 400 micron by using the above extruder with a melted temperature T=215° C.

A portion of the film is converted into the acid form by treatment at 80° C. for 24 hours with KOH at 10% by weight, washing with $H_2O$ and subsequent treatment at room temperature for 24 hours with HCl at 20% by weight and subsequent washing with $H_2O$. It has a hydration at 100° C. of 76.7%.

The film conditioned in air at 25° C. and 50% of relative humidity has a stress at break of 26 MPa (ASTM D 1708).

Example 3

In a 22 liter autoclave, the following reactants are introduced:

11.5 l of demineralized water;

980 g of the monomer of formula $CF_2$=CF—O—$CF_2CF_2$—$SO_2F$;

3,100 g of an aqueous solution at 5% by weight of a fluoropolyoxyalkylene having acid end group potassium salified with average molecular weight 521, of formula:

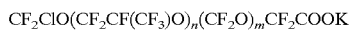

$CF_2ClO(CF_2CF(CF_3)O)_n(CF_2O)_mCF_2COOK$ wherein n/m=10;

The autoclave, kept understirring at 540 rpm, is heated to 50° C. Then 300 ml of an aqueous solution having a concentration of 28 g/l of potassium persulphate (KPS) are fed into the autoclave. The pressure is brought to 11 absolute atm by introducing TFE. The reaction starts after 1 minute. The pressure is maintained at 11 absolute atm by feeding TFE. When 1,000 g of TFE have been fed to the reactor, 175 g of the sulphonyl monomer of formula $CF_2$=CF—O—$CF_2$—$CF_2$—$SO_2F$ are introduced into the reactor. From now on, 175 g of the sulphonyl monomer of formula $CF_2$=CF—O—$CF_2CF_2SO_2F$ are introduced into the reactor every 200 g of fed TFE. The total amount of TFE fed to the reactor is equal to 4,000 g.

The reaction is stopped after 307 minutes from the start as described in Example 1. The produced latex has a solid content of 26.0% by weight. The productivity of the obtained sulphonic ionomer in g/(l×h) is 68.

The latex is coagulated by freezing and unfreezing, the polymer is separated from the mother liquors, washed with water up to a constant pH of the washing waters and dried at 150° C. for 40 hours at room pressure. Some grams of the dried polymer powder are converted into the acid form by treatment at 80° C. for 24 hours as described in Example 1. The copolymer equivalent weight, determined by titration on the polymer in the acid form results to be 980 g/eq, corresponding to a composition of 87.5% by moles of TFE and 12.5% by moles of sulphonic monomer. The polymer in the sulphonyl fluoride form results to have a MFI=0.4 g/10' at 280° C. with a load of 5 kg.

The polymer in the sulphonyl fluoride form is transformed into granules by the extruder of Example 1 by using a melted temperature T=315° C.

The granules are transformed in film having a thickness ranging from 10 to 400 micron by the extruder of Example 1, by using a melted temperature T=300° C.

A part of the film is converted into the acid form as in Example 1.

It has a hydration at 100° C. of 43.9%. The film conditioned in air at 25° C. and 50% of relative humidity has a stress at break of 30 MPa.

Example 4

In a 22 liter autoclave, the following reactants are introduced:

11.5 l of demineralized water;

980 g of the monomer of formula $CF_2$=CF—O—$CF_2CF_2$—$SO_2F$;

3,100 g of an aqueous solution at 5% by weight of a fluoropolyoxyalkylene having acid end group potassium salified with average molecular weight 521, of formula:

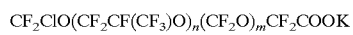

$CF_2ClO(CF_2CF(CF_3)O)_n(CF_2O)_mCF_2COOK$ wherein n/m 10;

The autoclave, kept under stirring at 540 rpm, is heated to 50° C. 0.2 atm of ethane are fed to the reactor. Then 300 ml of an aqueous solution having a concentration of 28 g/l of potassium persulphate (KPS) are fed into the autoclave. The pressure is brought to 11 absolute atm by introducing TFE. The reaction starts after 1 minute. The pressure is maintained at 11 absolute atm by feeding TFE. When 1,000 g of TFE have been fed to the reactor, 175 g of the sulphonyl monomer of formula $CF_2$=CF—O—$CF_2$—$CF_2$—$SO_2F$ are introduced into the reactor. From now on, 175 g of the sulphonyl monomer of formula $CF_2$=CF—O—$CF_2CF_2SO_2F$ are introduced into the reactor every 200 g of fed TFE. The total amount of TFE fed to the reactor is equal to 4,000 g.

The reaction is stopped after 327 minutes from the start as in Example 1.

The produced latex has a solid content of 26.0% by weight. The productivity of the obtained sulphonic ionomer in g/(l×h) is 56. The latex is coagulated by freezing and unfreezing, the polymer is separated from the mother liquors, washed with water up to a constant pH of the washing waters and dried at 150° C. for 40 hours at room pressure. Some grams of the dried polymer powder are converted into the acid form as in Example 1.

The copolymer equivalent weight, determined by titration on the polymer in the acid form results to be 1,010 g/eq, corresponding to a composition of 88% by moles of TFE and 12% by moles of sulphonic monomer. The polymer in the sulphonyl fluoride form results to have a MFI=14 g/10' at 280° C. with a load of 5 kg.

The polymer in the sulphonyl fluoride form is transformed into granules by the extruder of Example 1 by using a melted temperature T=225° C.

The granules are transformed in film having a thickness ranging from 10 to 400 micron by extrusion using a melted temperature T=240° C.

A part of the film is converted into the acid form as in Example 1.

It has a hydration at 100° C. of 43.5%. The film conditioned in air at 25° C. and 50% of relative humidity has a stress at break of 29 MPa.

Example 5

In a 22 liter autoclave, the following reactants are introduced:

11.5 l of demineralized water;

980 g of the monomer of formula $CF_2$=CF—O—$CF_2CF_2$—$SO_2F$;

3,100 g of an aqueous solution at 5% by weight of a fluoropolyoxyalkylene having acid end group potassium salified with average molecular weight 521, of formula:

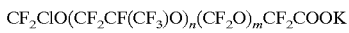

wherein n/m=10;

The autoclave, kept under stirring at 540 rpm, is heated to 50° C. Then 300 ml of an aqueous solution having a concentration of 28 g/l of potassium persulphate (KPS) are fed into the autoclave. The pressure is brought to 12 absolute atm by introducing TFE. The reaction starts after 1 minute. The pressure is maintained at 12 absolute atm by feeding TFE. When 1,000 g of TFE have been fed to the reactor, 175 g of the sulphonyl monomer of formula $CF_2=CF—O—CF_2—CF_2—SO_2F$ are introduced into the reactor. From now on, 175 g of the sulphonyl monomer of formula $CF_2=CF—O—CF_2CF_2SO_2F$ are introduced into the reactor every 200 g of fed TFE. The total amount of TFE fed to the reactor is equal to 4,000 g.

The reaction is stopped after 224 minutes from the start according to the procedure of Example 1. The produced latex has a solid content of 28.8% by weight. The productivity of the obtained sulphonic ionomer in g/(l×h) is 92.

The latex is coagulated as in Example 1, washed with water up to a constant pH of the washing waters and dried at 150° C. for 40 hours at room pressure. Some grams of the dried polymer powder are converted into the acid form as in Example 1.

The copolymer equivalent weight, determined by titration on the polymer in the acid form results to be 1,106 g/eq, corresponding to a composition of 89.2% by moles of TFE and 10.8% by moles of sulphonic monomer. The polymer in the sulphonyl fluoride form results to have a MFI 0.2 g/10' at 280° C. with a load of 5 kg (MFE=18/10' at 280° C. with a load of 10 kg).

The polymer in the sulphonyl fluoride form is transformed into granules by the extruder of Example 1 by using a melted temperature T=315° C.

The granules are transformed in film having a thickness ranging from 10 to 400 micron by extrusion by using a melted temperature T=300° C.

A part of the film is converted into the acid form as in Example 1.

It has a hydration at 100° C. of 35%.

The film conditioned in air at 25° C. and 50% of relative humidity has a stress at break of 34 MPa.

Example 6

In a 22 liter autoclave, the following reactants are introduced:

11.5 l of demineralized water;
980 g of the monomer of formula $CF_2=CF—O—CF_2CF_2—SO_2F$;
3,100 g of an aqueous solution at 5% by weight of a fluoropolyoxyalkylene having acid end group potassium salified with average molecular weight 521, of formula:

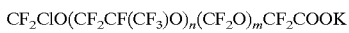

wherein n/m=10;

The autoclave, kept under stirring at 540 rpm, is heated to 50° C. 0.2 atm of ethane are fed to the reactor. Then 300 ml of an aqueous solution having a concentration of 14 g/l of potassium persulphate (KPS) are fed into the autoclave. The pressure is brought to 13 absolute atm by introducing TFE. The reaction starts after 6 minutes. The pressure is maintained at 13 absolute atm by feeding TFE. When 800 g of TFE have been fed to the reactor, 220 g of the sulphonyl monomer of formula $CF_2=CF—O—CF_2—CF_2—SO_2F$ are introduced into the reactor. From now on, 220 g of the sulphonyl monomer of formula $CF_2=CF—O—CF_2CF_2SO_2F$ are introduced into the reactor every 200 g of fed TFE. The total amount of TFE fed to the reactor is equal to 4,000 g.

The reaction is stopped after 429 minutes from the start according to the procedure of Example 1. The produced latex has a solid content of 24.4% by weight. The productivity of the obtained sulphonic ionomer in g/(l×h) is 40.

The latex is coagulated as in Example 1, washed with water up to a constant pH of the washing waters and dried at 150° C. for 40 hours at room pressure. Some grams of the dried polymer powder are converted into the acid form as in Example 1.

The copolymer equivalent weight, determined by titration on the polymer in the acid form results to be 1,190 g/eq, corresponding to a composition of 90.1% by moles of TFE and 9.9% by moles of sulphonic monomer. The polymer in the sulphonyl fluoride form results to have a MFI=10 q/10' at 280° C. with a load of 5 kg.

The polymer in the sulphonyl fluoride form is transformed into granules by the extruder of Example 1 by using a melted temperature T=265° C.

The granules are transformed in film having a thickness ranging from 10 to 400 micron by extrusion by using a melted temperature T=260° C.

A part of the film is converted into the acid form as in Example 1.

It has a hydration at 100° C. of 31.0%.

Example 7

In a 2 liter autoclave, the following reactants are introduced:

700 ml of demineralized water;
45 ml of the monomer of formula $CF_2=CF—O—CF_2CF_2—SO_2F$;
77.3 g of an aqueous solution at 15% by weight of a fluoropolyoxyalkylene having acid end group potassium salified with average molecular weight 527, of formula:

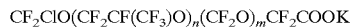

wherein n/m=10.

The autoclave, kept under stirring at 700 rpm, is heated to 50° C. Then 400 ml of an aqueous solution having a concentration of 20 g/l of potassium persulphate (KPS) are fed into the autoclave. The pressure is brought to 3 absolute atm by introducing TFE. The reaction starts after 5 minutes. The pressure is maintained at 3 absolute atm by feeding TFE. During the polymerization 7.5 ml of the sulphonyl monomer of formula $CF_2=CF—O—CF_2—CF_2—SO_2F$ are introduced into the reactor every 6.5 g of fed TFE. The reaction is stopped after 303 minutes from the start reducing the stirring, cooling and venting the reactor under vacuum. The produced latex has a solid content of 30% by weight. The polymer composition determined by NMR results to be of 69.8% by moles of TFE and 30.2% by moles of sulphonic monomer, corresponding to an equivalent weight of 511 g/eq. The productivity is equal to 70 g of polymer obtained per liter and per hour of polymerization.

What is claimed is:

1. A polymerization process in aqueous emulsion of:
(I) one or more fluorinated monomers containing at least one ethylene unsaturation;
(II) one or more fluorinated monomers containing sulphonyl groups —SO$_2$F;
said process comprising:
reactor purging, monomer (II) introduction in liquid form into the reactor, reactor pressurization with gaseous monomers (I); addition of at least one surfactant of formula:

$$R_f\text{—}X^-M^+$$

wherein:
X is equal to —COO, —SO$_3$;
M is selected from H, NH$_4$, alkaline metal;
R$_f$ represents a (per)fluoropolyether chain, preferably having number average molecular weight comprised between about 230 and about 1,800, preferably from 300 to 750, said (per)fluoropolyether chain comprising repeating units selected from one or more of the following:
a) —(C$_3$F$_6$O)—;
b) —(CF$_2$CF$_2$O)—;
c) —(CFL$_0$O)—, wherein L$_0$=—F, —CF$_3$;
d) —CF$_2$(CF$_2$)$_{z'}$CF$_2$O—, wherein z' is an integer 1 or 2;
e) —CH$_2$CF$_2$CF$_2$O—;
R$_f$ is monofunctional, and has a (per)fluorooxyalkyl end group T, optionally in the (per)fluoroalkyl end groups one fluorine atom is substituted by one chlorine or hydrogen atom;
addition of the initiator, and during the polymerization feeding of monomers (I) so as to maintain constant the reactor pressure; optionally further addition of monomer (II) and chain transfer agents.

2. A process according to claim 1, wherein the monomer (II) is added by steps.

3. A process according to claim 1, wherein R$_f$ has one of the following structures:
1) T—(CF$_2$O)$_a$—(CF$_2$CF$_2$O)$_b$—CF$_2$ with b/a comprised between 0.3 and 10, extremes included, a being an integer different from 0;
2) T—(CF$_2$—(CF$_2$)$_{z'}$—CF$_2$O)$_{b'}$—CF$_2$ wherein z' is an integer equal to 1 or 2;
3) T—(C$_3$F$_6$O)$_r$—(C$_2$F$_4$O)$_b$—(CFL$_0$O)$_t$—CF$_2$— with r/b=0.5–2.0 (r+b)/t=10–30, b and t being integers different from 0 when all the units with indexes r, b, and t are present; or b=t=0, or b=0;
a, b, b', r, t, are integers, whose sum is such that R$_f$ has the above values of number average molecular weight.

4. A process according to claim 1, wherein the fluorinated monomers of type (I) are selected from:
vinylidene fluoride (VDF);
C$_2$–C$_8$ perfluoroolefins, preferably tetrafluoroethylene (TFE);
C$_2$–C$_8$ chloro- and/or bromo- and/or iodo-fluoroolefins, such as chlorotrifluoroethylene (CTFE) and bromotrifluoroethylene;
(per)fluoroalkylvinylethers (PAVE) CF$_2$=CFOR$_f$, wherein R$_f$ is a C$_1$–C$_6$ (per) fluoroalkyl, for example trifluoromethyl, bromo difluoromethyl, pentafluoropropyl;
perfluoro-oxyalkylvinylethers CF$_2$=CFOX, wherein X is a C$_1$–C$_{12}$ perfluorooxyalkyl having one or more ether groups, for example perfluoro-2-propoxy-propyl;
the fluorinated monomers of type (II) are selected from:
F$_2$C=CF—O—CF$_2$—CF$_2$—SO$_2$F (vinylsulphonylfluoride);
F$_2$C=CF—O—[CF$_2$—CXF—O]$_n$—CF$_2$—CF$_2$—SO$_2$F wherein X=Cl, F or CF$_3$; n=1–10;
F$_2$C=CF—O—CF$_2$—CF$_2$—CF$_2$—SO$_2$F;
F$_2$C=CF—Ar—SO$_2$F.

5. A process according to claim 1, wherein in the polymerization process comonomers in an amount in the range 0.01–5% by moles, bis olefins of formula:

$$R_1R_2C=CH\text{—}(CF_2)_m\text{—}CH=CR_5R_6 \quad (III)$$

are used, wherein:
m=2–10, preferably 4–8;
R$_1$, R$_2$, R$_5$, R$_6$, equal to or different from each other, are H or C$_1$–C$_5$ alkyl groups.

6. A process according to claim 1, wherein in the polymerization process brominated and/or iodinated "cure-site" comonomers are fed; alternatively or also in combination with the "cure-site" comonomers, it is possible to introduce in the end groups iodine and/or bromine atoms by addition to the reaction mixture of iodinated and/or brominated chain transfer agents or chain transfer agents containing hydrogen, such as hydrocarbons, alcohols, in particular ethyl acetate and ethane.

7. A process according to claim 1, wherein in the polymerization process as comonomers are used:
TFE;
CF$_2$=CF—O—CF$_2$CF$_2$SO$_2$F;
optionally a bis-olefin of formula (III), wherein R$_1$, R$_2$, R$_5$, R$_6$ are H and m=6 or 8.

8. A process according to claim 1, wherein the sulphonic fluorinated ionomers have equivalent weight comprised between 300 and 1,700.

9. A process according to claim 1, wherein the polymerization is carried out at temperatures in the range 25°–130° C., at atmospheric pressure or under pressure, preferably from 2 bar up to 60 bar.

10. A process according to claim 9, wherein the temperature is in the range 50°–70° C., preferably 50°–60° C., under pressure up to 30 bar, preferably higher than 8.

* * * * *